April 28, 1931.  A. B. JOHNSON  1,802,514
SAWING MACHINE
Filed June 10, 1929  2 Sheets-Sheet 1

Inventor
Arthur B. Johnson
By his Attorney
Michael Kilger

April 28, 1931.     A. B. JOHNSON     1,802,514
SAWING MACHINE
Filed June 10, 1929     2 Sheets-Sheet 2
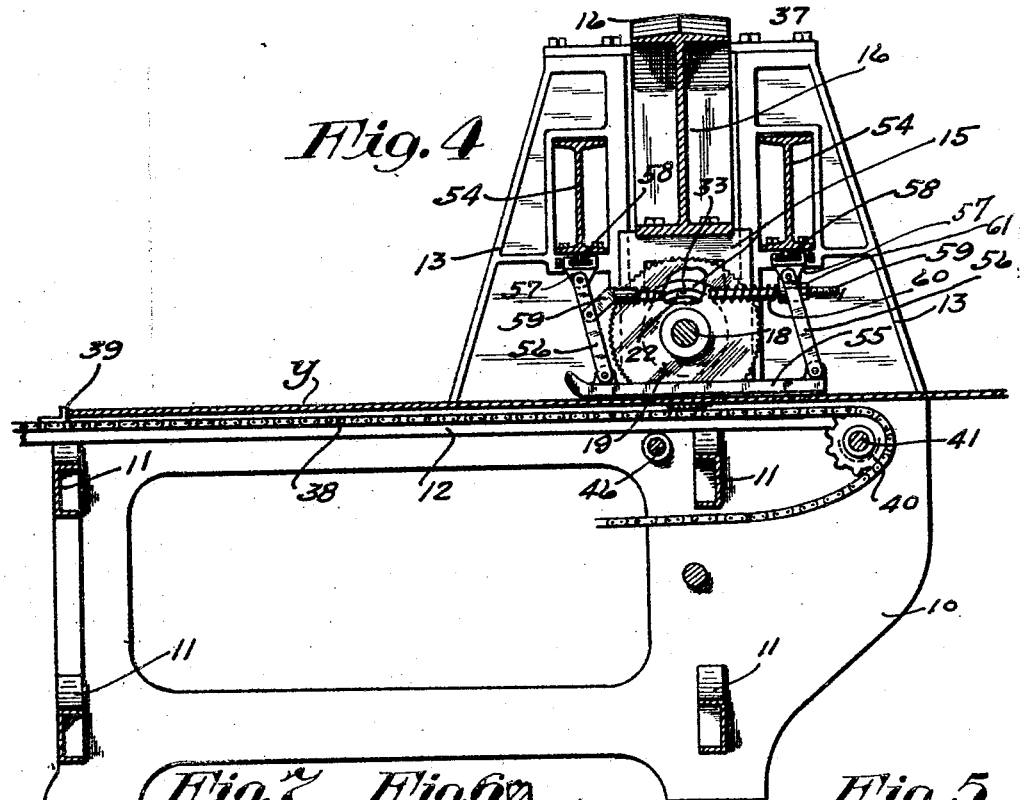
Inventor
Arthur B. Johnson
By his Attorneys
Merchant & Kilgore Patented Apr. 28, 1931

1,802,514

UNITED STATES PATENT OFFICE

ARTHUR B. JOHNSON, OF MINNEAPOLIS, MINNESOTA

SAWING MACHINE

Application filed June 10, 1929. Serial No. 369,613.

My present invention relates to saw machines of the type wherein a plurality of saws are carried by a common arbor and by the use of which machine, boards, lumber or similar material such as artificial insulating sheets or composition board may be sawed into a plurality of strips or a plurality of lengths; and, generally stated, the invention consists of the novel devices, combinations of devices and arrangement of parts hereinafter described and defined in the claims.

In machines of this character, material to be sawed is usually fed to overhead saws by lug-equipped power-driven feed chains. This invention is directed first to a novel arrangement of saw arbor, driving motor and supporting beam for the arbor, whereby the saw-equipped arbor and directly connected motor are arranged for simultaneous adjustments as a self-contained unit, and longitudinal expansion and contraction of the saw arbor is permitted by a novel arrangement of bearings; and second, to a novel co-operative arrangement with the parts noted of the hold-down mechanism for pressing the material to be sawed against the supporting skids or deck while the material is being fed to and past the saws.

In the accompanying drawings, which illustrate a commercial form of this improved machine, like characters indicate like parts throughout the several views.

Referring to the drawings:

Fig. 1 is a perspective showing the machine and illustrating particularly the out-feed or discharge end thereof;

Fig. 2 is a view with some parts broken away showing certain of the parts of the machine sectioned approximately in the longitudinal plane indicated by dotted lines marked 2—2 on Fig. 1 and with some parts removed;

Fig. 3 is a fragmentary view looking at the opposite end of the machine from that presented to the observer in Fig. 1;

Fig. 4 is a vertical longitudinal section taken approximately centrally through the machine shown in Fig. 1;

Fig. 5 is a detail in section on the line 5—5 of Fig. 3;

Fig. 6 is a detail showing an intermediate bearing for the arbor shaft and certain associated parts, some of the parts being sectioned approximately in the longitudinal plane of the line marked 6—6 on Fig. 1;

Fig. 7 is a front elevation of the bearing shown in Fig. 6, some parts thereof being sectioned axially on the line 7—7 of Fig. 6;

Fig. 8 is a detail showing a split wedge ring used in the end bearings, the same being shown in elevation; and Fig. 9 is a section taken on the line 9—9 of Fig. 8.

The frame of the machine illustrated comprises cast side plates 10, crossties 11 and a feed deck made up of a plurality of laterally spaced skids or rails 12 that are rigidly supported by the main frame. Arbor beam supporting brackets 13 are rigidly secured to and extend upward from the side plates 10 of the main frame. These brackets 13 have parallel opposing edges spaced so that they afford vertical guides for the outer end arbor bearing blocks 14 and 15. As shown, said blocks 14 and 15 have grooved vertical edges that overlap and are slidably engageable with the opposing faces of the brackets 13. The two end bearing blocks 14 and 15 support a heavy transverse arbor-supporting beam 16 that is preferably a cast structure in the form of a tapered I-beam one end of which is extended beyond the bearing in the form of a T-beam 16$^a$ to afford a motor support to which the frame of an electric motor 17 is rigidly hung.

The saw arbor which is in the form of a long heavy shaft 18 is mounted in the end bearing blocks by means of anti-friction bearing devices of novel construction and arrangement. The saw arbor 18 is provided with laterally spaced circle saws 19 which, as is customary, are axially adjustable thereon by well known means not necessary for the purpose of this case to consider. Long saw arbors, such as here illustrated, equipped with a large number of saws, will tend to sag under their weight and hence an intermediate bearing therefor is desirable. This intermediate bearing is afforded by an intermediate bearing bracket 20 which, as best shown in Figs. 6 and 7, is slidably hung on the bottom flange of the beam 16. The bracket 20 is detachably secured to the lower flange of said beam 16 by screw-secured retaining plates 21. Here it should be stated that the bottom flange of the beam 16 is machined so that its bottom surface is perfectly flat and straight and its edges are perfectly parallel so that adjustments of the bearings thereon can be made without at all changing the line of the saw arbor.

The construction of the saw arbor bearing, that is, the arbor bearing near to or closest to the motor 17 and that at the opposite side of the machine or end of said arbor are alike with minor exceptions to be hereinafter noted. Each bearing comprises a cylindrical bearing cartridge 22 mounted in a cylindrical seat 23 in the co-operating end bearing block. The cylindrical seats 23 are, of course, aligned on a common axis that is parallel to the bottom and lower edge flanges of the beam 16. An outer ball race 24 is mounted in each cartridge 22. Bearing balls 25 are interposed between the outer bearing races 24 and co-operating inner bearing ball races 26. The ball races 26 are mounted on sleeves 27 that closely fit the arbor 18, as best shown in Fig. 5. Angular nuts 28 threaded on the inner ends of the sleeves 27 clamp the ball races 26 against shoulders on said sleeves.

The outer ends of the sleeves 27 are diametrically expanded and internally threaded to receive externally threaded clamping nuts 29 that press slit conical clamping rings 30 against internal conical seats of said sleeves and compress the same onto the arbor so that the just noted elements 26, 27, 28 and 29 are all rigidly secured to the arbor and rotate therewith. As shown in Fig. 5, the outer ball races 24 are clamped against shoulders of the respective cartridge 22 by annular cartridge caps 31. The cartridge 22 at the near side of the machine or closest to the motor 17 is rigidly secured in the bearing block 14 by a set screw 32 shown in Figs. 1 and 2.

In practice it has been found that a long saw arbor such as here employed will vary somewhat in length under varying temperatures and hence to compensate for such expansion and contraction, I have arranged the cartridge 22 at the far side of the machine for axial sliding movements in the bearing block 15. This cartridge, while capable of the noted axial sliding movements is held against rotation by a long key and groove connection 33 shown in Figs. 3 and 5. It will, of course, be understood that when by expansion or contraction of the arbor 18 the inner ball race 26 is moved axially, the co-operating outer ball race will be caused to move axially therewith, thereby imparting the axial movement to the cartridge 22 that is required to compensate for axial expansion and contraction of the arbor.

The bearing at the intermediate portion of the saw arbor will, of course, be subjected to much less axial movement than the bearing at the far side of the machine and hence I have made provision for axial movement of the outer ball race directly in the intermediate arbor bearing bracket 20. In this intermediate bearing, best shown in Figs. 6 and 7, the inner ball race 26$^a$ corresponds to the ball races 26, the outer ball race 24$^a$ corresponds to the outer ball races 24, the bearing balls 25$^a$ to the bearing balls 25, the clamping nut 28$^a$ corresponds to the clamping nut 28, the clamping nut 29$^a$ to the clamping nut 29 and the split clamping wedge 30$^a$ to the split wedge 30. In this arrangement, however, the outer ball race 24$^a$ is, as already indicated, mounted for axial sliding movements in a cylindrical seat 23$^a$ that is axially aligned with the cylindrical seats 23 of the bearing blocks 14 and 15. The numeral 34 indicates an annular cover plate detachably secured to the bearing bracket 20 by machine screws 35. In Fig. 1, the saw arbor 18 is shown as directly connected to the shaft of the electric motor 17 by a suitable coupling 36 so that the axially aligned arbor and motor shaft become substantially a continuous shaft. As shown in Figs. 1, 2 and 3, tiebars 37 are secured across the tops of the co-operating arbor beam brackets 13.

The above described construction and arrangement of the bearings for the saw arbor 18 is highly important. It permits the use of a shaft or saw arbor of constant diameter and provides anti-friction bearings that may be applied to the shaft or arbor at any desired point, inasmuch as the bearings are frictionally clamped to said arbor or shaft. Also it obviates the necessity of turning down or decreasing the diameter of the arbor at certain points for the application of bearings and which turning, in practice, is not only expensive but is liable to produce an eccentricity between the mechanism and reduced diameters of the shaft.

The means for feeding the material such as sheets $y$ shown in Fig. 4, includes feed chains 38 equipped with transversely aligned work engaging lugs 39 and arranged to run over sprockets 40 carried by shafts 41 (only the rear of which shafts is shown) journaled in suitable bearings on the side plates 10 and skids 12. The feed chains 38 work below the top surface of the skids 12 but the lugs 39 carried thereby extend above the top of the skids and engage the back of the sheets of material $y$ and cause the same to slide along on the upper surface of the skids 12 to and past the lower edge portions of the saws. The skids 12, of course, are fixed and hence to adjust the saws vertically in respect to the lumber or material-supporting means the arbor supporting beam 16 and parts hung therefrom must be moved vertically and, of course, with like movements at both ends so that the arbor will always maintain a position parallel to the plane of the underlying supporting means afforded by the skids. For the purpose above stated, the vertically movable end or outside bearing blocks 14 and 15 are provided with depending screw-threaded stems 42 that work without threaded engagement through lugs 43 and through flanges on the side plates 10. Nut-acting worm gears 44 work with threaded engagement on the stems 42 and rest on the lugs 43. The two worm gears 44 mesh with co-operating worms 45 on a cross-shaft 46 journaled in suitable bearings on the side plates 10 and provided at its outer end with a hand-piece in the form of a hand wheel 47.

As already made clear, the saw arbor is driven independently of the other parts of the machine by its own or individual motor 17. The feed means may be driven in any suitable way so far as this invention is concerned, but, as shown, the rear sprocket shaft 41, at one projecting end, is provided with a sprocket wheel 48. A sprocket chain 49 runs over sprocket 48 and over a sprocket 50 that is secured to the face of an intermediate sprocket 51 journaled in a bearing on the adjacent frame plate 10. A sprocket chain 52 runs over the sprocket 51 and over a sprocket 53 that is driven through other mechanism not necessary for the purpose of this case to consider.

As a means for effectually holding the material to be sawed and especially for holding wide and more or less flexible sheets closely down onto the skids 12 as it is being fed to the saws, I provide a highly efficient hold-down device that gets its base of reaction in the frame of the machine independently of the arbor-supporting beam. For the purpose just above indicated, two crossbeams, preferably I-beams 54, are rigidly secured to the arbor beam brackets 13, one in front and one at the rear of the arbor beam 16 but in parallel relation thereto. For direct engagement with the material to be sawed, there is provided a plurality of longitudinally disposed parallel hold-down bars 55 connected to the lower ends of parallel links 56, the upper ends of which are pivoted to bearing blocks 57 that are rigidly but adjustably and slidably secured to guide bars 58 secured on the bottoms of beams 54 in parallel relation thereto and to each other. Each front link 56 is connected to the front end of a thrust rod 59, the rear end of which works freely through the co-operating rear bearing block 57, but is provided with a nut 61 that adjustably limits the forward movement of said thrust rod and hence the downward movement of the co-operating bar 55. On each thrust rod 59 is a coiled spring 60 that reacts against the rear bearing block 57 and against a shoulder on the front portion of said rod.

From the foregoing description it must be obvious that the saw arbor with the saws and the driving motor therefor may be given simultaneous vertical adjustments by adjustments of the saw arbor beam 16 and that throughout such adjustments perfect alignment of the saw abor and motor is maintained. Also, of course, the saws may be laterally adjusted on the arbor so as to position them for the cutting of strips of desired widths or for cutting up strips to desired lengths. Also the manner in which axial expansion and contraction of the saw arbor is permitted by shifting of the intermediate and far side bearings therewith has been clearly stated.

The sheets or strips of material to be sawed are delivered from the left toward the right in respect to Fig. 4 and as the material approaches the saws, it is forced under the shoe-acting hold-down bars 55. These hold-down bars are independently pressed by the co-operating springs 60 acting through the parallel links 56 and the adjustment of the links by means of the nuts 61 can be varied so that for a particular thickness of material to be sawed, the bars 55 will be but slightly raised under a movement of the material under the same. Also it is important to note that these bars 55 act yieldingly and independently on the material to be sawed at various different points adjacent to the respective saws so that even if material to be sawed in warped slightly, it will be tightly pressed downward under the underlying skids or rails 12. The forward ends of the bars 55 are turned upward so that if material much thicker than that for which the presser bars are properly set should be forced to the saws, said presser bars would yield and permit the passage thereof; moreover, for materials that vary greatly in thickness, readjustments of the setting of the bars 55 will not be necessary. The springs 66, however, act with greater downward pressing force on the bars 55 when the links 56 are near vertical positions as shown in Fig. 4, than they do when the said links are pressed rearward to greater lengths than to perpendicular, and hence by adjustments of the nuts 61, the force under which the bars 55 will be pressed downward may be varied.

It is further important to note that the upward pressure on the bars 55, which in the total is considerable, is transmitted by the links 56 to the beams 54 and consequently is not active on the arbor supporting beam 16 and such pressure has, therefore, no tendency to spring the bar 16 or cause dis-alignment of the arbor bearings. The machine described has, in practice, been found highly efficient for the purposes had in view and to be found extremely desirable and useful as a re-sawing device or as a device for cutting sheets into strips or strips into various lengths. While I have in the drawings illustrated a commercial form of the machine, it will, of course, be understood that the machine is capable of various modifications within the scope of the invention as herein disclosed and claimed.

What I claim is:

1. In a sawing machine, the combination with material-supporting and feeding means, of a saw arbor beam extended transversely above and in parallel relation to said supporting and feeding means, means for imparting like adjustments to opposite ends of said beam toward and from said supporting and feeding means, a saw-equipped arbor journaled to said beam in parallel relation thereto, and a motor having its frame secured to said beam and having its rotor aligned with and connected to said arbor.

2. In a sawing machine, a frame having upstanding end brackets, work guiding and feeding means mounted on said frame, a saw arbor beam extended transversely above said feeding and guiding means, bearing blocks secured to said beam and guided for vertical movements by said end brackets, means for imparting simultaneous and like vertical adjustments to said bearing blocks, a saw-equipped arbor journaled in said bearing blocks and extended in parallel relation to said feeding and guiding means, and an electric motor having its frame secured to an extended end of said saw arbor beam and having its rotor axially aligned with and connected to said saw arbor for directly driving the same.

3. In a sawing machine, a frame having upstanding end brackets, work guiding and feeding means mounted on said frame, a saw arbor beam extended transversely above said feeding and guiding means, bearing blocks secured to said beam and guided for vertical movements by said end brackets, means for imparting simultaneous and like vertical adjustments to said bearing blocks, a saw-equipped arbor journaled in said bearing blocks and extended in parallel relation to said feeding and guiding means, an electric motor having its frame secured to an extended end of said saw arbor beam and having its rotor axially aligned with and connected to said saw arbor for directly driving the same, additional beams one at the front and the other at the rear of said saw arbor beam anchored at their ends to said end brackets, and independently operative work-hold-down devices suspended from and reacting against said last noted beams and engageable with the work while it is being sawed.

4. The structure defined in claim 2 in further combination with additional beams, one at the front and the other at the rear of said saw arbor beam anchored at their ends to said end brackets, link bearings applied to the bottoms of said last noted beams, links pivoted to said bearings at their upper ends, presser bars carried by the lower ends of said links, and spring-pressed thrust rods operative on said links in pairs and yieldingly pressing said bars downward.

5. In a sawing machine, the combination with work guiding and feeding means, of a saw-equipped arbor overlying said guiding and feeding means, hold-down bars engageable with the material to be sawed, parallel links pivotally connected to said bars at their lower end and a basis of reaction for the upper ends of said links, and spring-pressed thrust rods operative on said links in pairs.

6. In a sawing machine, the combination with material-supporting and feeding means, of a saw arbor beam extended transversely above and in parallel relation to said supporting and feeding means, means for imparting like adjustments to opposite ends of said beam toward and from said supporting and feeding means, a saw-equipped arbor journaled to said beam in parallel relation thereto, and a motor secured to said beam and having driving connection with the arbor.

7. In a sawing machine, a frame having upstanding end brackets, work guiding and feeding means mounted on said frame, a saw arbor beam extended transversely above said feeding and guiding means, bearing blocks secured to said beam and guided for vertical movements by said end brackets, means for imparting simultaneous and like vertical adjustments to said bearing blocks, a saw-equipped arbor journaled in said bearing blocks and extended in parallel relation to said feeding and guiding means, and a motor secured to said saw arbor beam and having its rotor connected to the saw arbor for driving the same.

In testimony whereof I affix my signature.

ARTHUR B. JOHNSON.